United States Patent
Garcia

(12) 
(10) Patent No.: US 8,428,232 B2
(45) Date of Patent: Apr. 23, 2013

(54) CENTRALIZED COMMUNICATION HUB FOR DISPLAYING CALLS AND MESSAGES ON A DISPLAY

(75) Inventor: Maurice Garcia, Levittown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 205 days.

(21) Appl. No.: 12/818,711

(22) Filed: Jun. 18, 2010

(65) Prior Publication Data

US 2011/0310213 A1 Dec. 22, 2011

(51) Int. Cl.
*H04M 1/56* (2006.01)

(52) U.S. Cl.
USPC .................. 379/142.17; 379/142.04

(58) Field of Classification Search ............ 379/142.01, 379/142.04, 142.07, 142.17, 93.09, 93.17, 379/93.15, 93.21; 348/14.05, 14.04
See application file for complete search history.

(56) References Cited

U.S. PATENT DOCUMENTS

| | | | | |
|---|---|---|---|---|
| 5,805,677 | A * | 9/1998 | Ferry et al. | 379/93.35 |
| 6,243,448 | B1 * | 6/2001 | Corbett et al. | 379/93.35 |
| 6,831,969 | B2 * | 12/2004 | Ju | 379/142.16 |
| 6,853,713 | B1 * | 2/2005 | Fobert et al. | 379/142.17 |
| 7,133,507 | B2 * | 11/2006 | Basore et al. | 379/93.23 |
| 2004/0261115 | A1 * | 12/2004 | Bartfeld | 725/106 |
| 2007/0121584 | A1 * | 5/2007 | Qiu et al. | 370/352 |
| 2008/0066095 | A1 * | 3/2008 | Reinoso | 725/28 |
| 2009/0217325 | A1 * | 8/2009 | Kliger et al. | 725/78 |
| 2011/0205329 | A1 * | 8/2011 | Willis | 348/14.08 |

* cited by examiner

*Primary Examiner* — Olisa Anwah
(74) *Attorney, Agent, or Firm* — Banner & Witcoff, Ltd.

(57) ABSTRACT

Systems and methods are described that relate to a centralized communication hub at a user location for coordination of receiving/sending phone calls, SMS/MMS messages, and requests for video conferences to/from a display. A user may indicate that she wishes to receive a call/message by selecting an option on a remote control associated with the display. A microphone and/or camera connected to a gateway may provide audiovisual capabilities during a call. In a separate embodiment, the functionality of the communication hub may be split between two devices; one device detects incoming calls and a separate device routes the calls/messages to/from the appropriate gateway.

17 Claims, 7 Drawing Sheets

(RELATED ART SYSTEM)

CENTRALIZED COMMUNICATION HUB FOR DISPLAYING CALLS AND MESSAGES ON A DISPLAY

FIELD OF THE DISCLOSURE

This disclosure presents methods and systems directed to providing caller ID information to a display. Aspects of the disclosure provide for a centralized communication hub to direct incoming phone calls, SMS/MMS messages, video conferencing requests, or other signals to a gateway so that caller ID/SMS/MMS message information may be displayed on a display.

BACKGROUND OF THE DISCLOSURE

Currently, there are various communication systems that interface with customers at home. One type are phone systems that handle signaling and audio information on a twisted pair network, for example. Another type are television content delivery systems that deliver signals from a provider to a user.

Several providers have implemented first generation systems that provide features such as caller ID to the TV screen. Such features allow consumers to efficiently interface with both telephone and television systems from the same terminal, if only partly. For example, satellite TV provides caller ID to the TV by transmitting video and audio signals from geostationary satellites to satellite dishes on the Earth's surface. In a satellite TV caller ID system, a phone modem that is part of the satellite TV system located at the home monitors phone calls off of a twisted pair connection and overlays caller ID information onto the TV screen when the phone modem detects a call. However, the phone modem used in this implementation cannot perform other enhanced communication services (e.g., SMS/MMS messaging to TV, video conferencing to TV, etc.); the phone modem is simply a monitoring device that feeds the caller ID information to the TV.

In addition, certain television content providers also provide caller ID to the TV via a database lookup procedure. For instance, when an incoming call is detected, the caller ID information is intercepted by the service provider (SP). The SP, for example, may look up the user's device (e.g., a gateway or a set top box) information of the destination number in the company's customer database. Once the correct information is found, the caller ID information is packaged and propagated through the provider's infrastructure, a signaling pathway that potentially includes many intermediate servers, before the signal is transmitted completely through the system to the appropriate home. Assuming that the correct database lookup occurred, the correct caller ID information will be displayed by the device on a TV monitor.

FIG. 1 illustrates this procedure by showing a block diagram generally depicting how, for example, only a hybrid fiber coaxial (HFC) network may interface with a twisted pair telephone network to provide caller ID to a home television screen. The various blocks in FIG. 1 correspond to categories of network elements, and the arrows connecting those blocks indicate flows of data between those network elements. For example, data corresponding to services is received from and sent to one or more backbone IP networks 1001 by routers represented by block 1002. Service data may include broadcast data (e.g., television broadcast programming), narrowcast data (e.g., VOD and switched digital video (SDV) programming) and unicast data (e.g., high speed data (HSD) service providing Internet connectivity to individual subscribers and VoIP or other type of telephone service). The backbone network may be, e.g., a system operator's national IP network, the Internet, some combination of the Internet and a system operator's network etc. Typically, several layers of routers (e.g., at the national, regional and local levels) are part of block 1002. Broadcast and narrowcast data is routed to universal edge QAM (quadrature amplitude modulation) devices (UEQAMs) that are typically located in distribution hubs, which devices are represented in FIG. 1 by block 1003. Unicast data is routed to and from cable modem termination system (CMTS) cores 1004, with those CMTS cores also typically located in distribution hubs. Downstream unicast data is sent from CMTS cores to UEQAMs. The UEQAMs then modulate the broadcast, narrowcast and unicast downstream data into RF frequency channels that are combined (block 1005) and communicated to QAM-modulated lasers 1006 for fiber optic transmission to individual service group nodes (block 1007). Blocks 1001, 1002, 1003, 1004, 1005, 1006, and 1008 (receivers for upstream data) generally comprise HFC components located at the service provider headend 1009.

The service group nodes convert the downstream optically-transmitted signals to electrical signals for distribution over coaxial cables to subscriber devices such as cable modems (CMs), set top boxes (STBs), media terminal adapters (MTAs), etc. These nodes typically comprise QAM receivers 1008 and amplifiers 1010 for boosting the electrical signals for transmission downstream via coaxial lines to subscriber homes. Meanwhile, upstream transmissions from subscribers are received at nodes 1007, converted to optical signals and forwarded to a QAM receiver 1008 by QAM-modulated laser 1006. The QAM receiver 1008 then forwards optical signals to the CMTS cores 1004 where those optical signals are converted to electrical signals and further processed.

Twisted pair network 1011 may interface with the HFC network at number of locations, including via a router 1012 located in service group node 1007. Router 1012 may be equipped to forward incoming/outgoing telephone call information on twisted pair network 1011 to headend 1009 via QAM laser 1006 and QAM receiver 1008. The telephone call information may then be cross-referenced with information in customer databases 1013 to determine where the incoming/outgoing telephone call should be routed. Databases 1013 maintained by a SP may include billing databases and conditional access databases, among others. Once headend 1009 has located the appropriate destination address for an incoming/outgoing telephone call, this information may be propagated through the headend via the CMTS 1004, QAM 1003, RF channels 1005, and laser 1006 to service group node 1007 and eventually to a home via coaxial lines. Once the telephone information reaches a home, it may be displayed on a television screen just as any other cable television signal.

Unfortunately, these and other types of network systems are error-prone. For example, the correct destination information may be retrieved only if the billing entries in the database are appropriately updated. In the event that old or incorrect entries exist in the records, the caller ID information may be sent to the wrong destination device (e.g., set top box), for example. In this scenario, customers would receive caller ID information on their TV screens for phone calls that were not intended for them.

For these and other reasons, a more simplistic approach that is less error-prone is needed to provide a service for supplying caller ID information to a television/personal computer (PC) display screen or other display.

BRIEF SUMMARY OF THE DISCLOSURE

The following presents a simplified summary in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

To overcome limitations in the prior art, and to overcome other limitations that will be apparent upon reading and understanding the present specification, the present disclosure is directed to a centralized communication hub for routing phone calls, SMS/MMS messages, requests for video conferences, television signals, and other signals to a device, for example, a device having set top box-type functionality or a gateway type device.

One aspect of the disclosure provides an integrated hub that routes incoming/outgoing telephone calls, SMS/MMS messages, and video conference requests, for example, to a line with television signals so that all the signals may be transmitted to a device for display on a screen.

Another aspect of the disclosure provides a communication architecture in which separate devices are used to route incoming/outgoing telephone calls, SMS/MMS messages, and video conference requests, for example, to a line with television signals so that all signals may be transmitted to a device for display on a screen.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION OF THE DISCLOSURE

In the following description of the various embodiments, reference is made to the accompanying drawings, which form a part hereof, and in which is shown by way of illustration various embodiments in which aspects may be practiced. It is to be understood that other embodiments may be utilized and structural and functional modifications may be made without departing from the scope of the present disclosure.

Aspects described herein provide systems and methods for providing telephone call/SMS/MMS message information on a display screen. The disclosed aspects may be employed in various networks and systems, such as HFC, cable, fiber, or other hybrid systems, including IP and wireless systems. For the sake of brevity, the description may refer to components typically used in HFC-type systems, but it is to be understood that all such references are made for illustrative purposes only, and the inventive embodiments described herein may be contemplated over other types of networks and systems. In one embodiment, residential network gateway (RNG) and/or Tru2way™ protocols may be used in combination with a multimedia over coax alliance (MoCA) compatible media terminal adapter (MTA) to provide a user of a device, such as a set top box, the ability to send/receive phone calls/SMS/MMS messages. In general, as used in this disclosure, an MTA refers to a hardware device that interfaces with an IP network and that uses internet connectivity deployed through a modem such as a DSL modem, cable modem, and/or other Ethernet connection hardware. A MTA is used for delivery of VoIP services, and can be implemented either as an embedded MTA (eMTA) within a DOCSIS cable modem or as a standalone MTA device that connects to a cable modem. MTAs operate in compliance with IETF RFCs 4682 and 5098.

Figure 1:
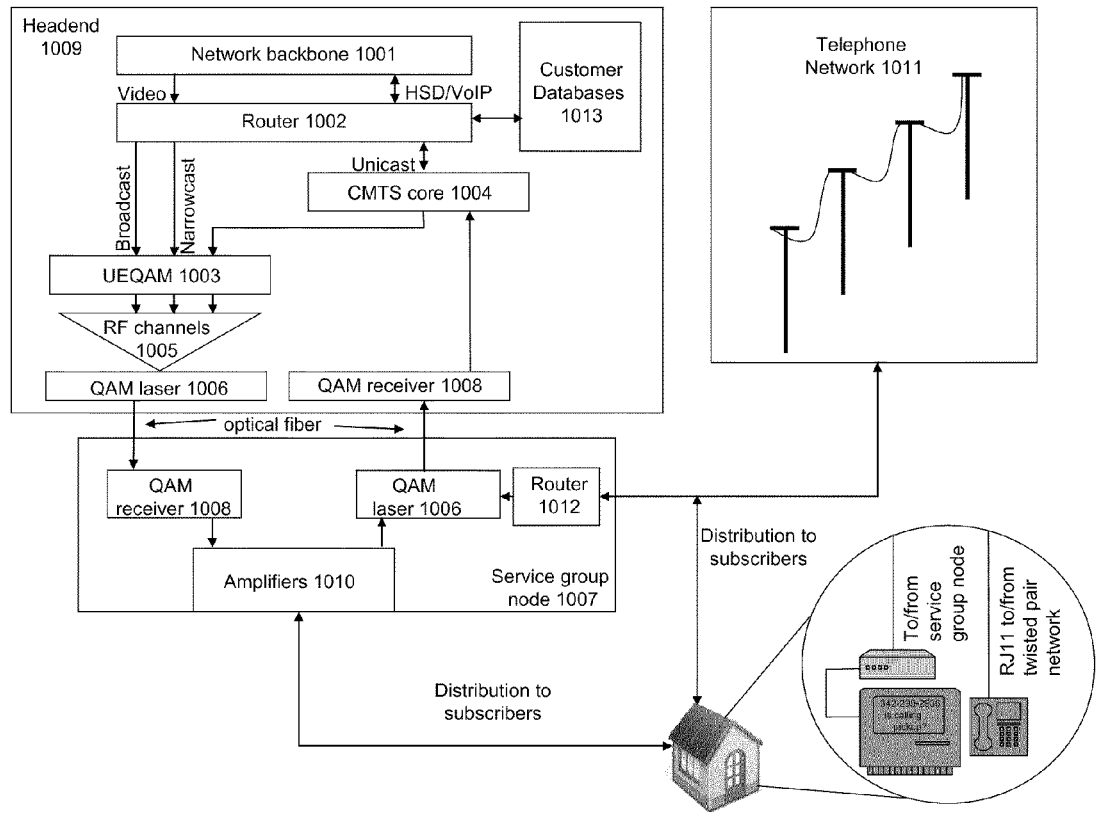
FIG. 1 illustrates a related art system.
Figure 2:
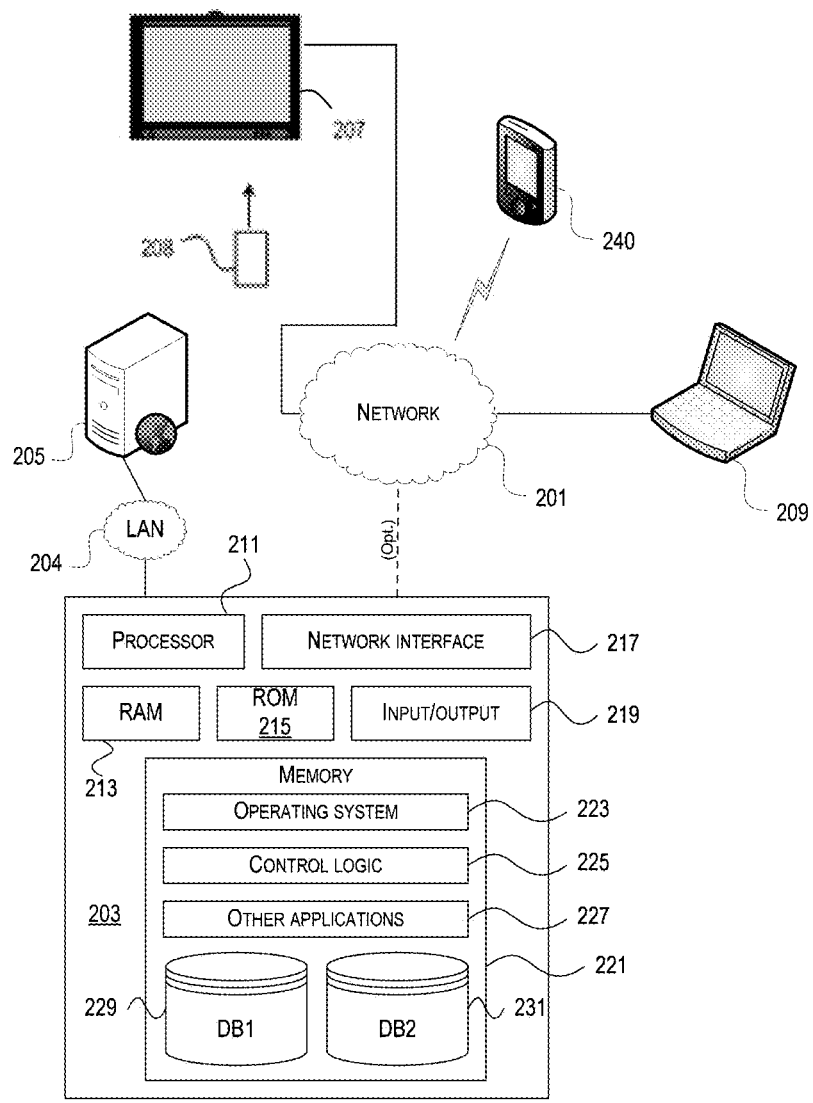
FIG. 2 illustrates a network with a data processing device that may be used to implement one or more illustrative aspects described herein.

FIG. 2 shows an exemplary network 201 (e.g., wide area network (WAN)) and data processing device 203 with media terminal adapter and/or set top box type functionality that may be used to implement one or more illustrative aspects described herein. Device 203 may be any type of computer, server, decoder, gateway, set top box, router, switch, or other data processing device. Device 203 may also include a processor 211 for controlling overall operation of device 203. Device 203 may further include RAM 213, ROM 215, network interface 217, input/output interfaces 219 (e.g., keyboard, mouse, display, printer, etc.), and memory 221. I/O 219 may include a variety of interface units and drives for reading, writing, displaying, and/or printing data or files, as well as a camera (e.g., webcam), speaker, and/or microphone. Device 203 may use I/O 219 to communicate with peripherals including a television 207, laptop 209, desktop 205, and/or game console 240. Television 207 may include a remote control 208 for communicating with television 207. Communication with desktop 205 may occur via local access network (LAN) 204.

Memory 221 in device 203 may further store operating system software 223 for controlling overall operation of the data processing device 203, control logic 225 for instructing device 203 to perform aspects as described herein, and other application software 227 providing secondary, support, and/or other functionality which may or may not be used in conjunction with various aspects described herein. The control logic may also be referred to herein as the server software 225. Functionality of the server software may refer to operations or decisions made automatically based on rules coded into the control logic, made manually by a user providing input into the system, and/or a combination of automatic processing based on user input (e.g., queries, data updates, etc.).

Memory 221 may also store data used in performance of one or more aspects of the disclosure, including a first database 229 and a second database 231. In some embodiments, the first database may include the second database (e.g., as a separate table, report, etc.). That is, the information can be stored in a single database, or separated into different logical, virtual, or physical databases, depending on system design. Devices 205, 207, 209, and/or 240 may have similar or different architecture as described with respect to device 203. Those of skill in the art will appreciate that the functionality of device 203 (or device 205, 207, 209, 240) as described herein may be spread across multiple data processing devices.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Network 201 may comprise, for example, a wired or wireless network, a wide area network (WAN) 201, such as the Internet, a cable distribution network, fiber optic network, hybrid network, private intranets, corporate networks, LANs, wireless networks, personal networks (PAN), storage area networks (SAN), etc. Network 201 is for illustration purposes and may be replaced with additional networks. Device 203 may be connected to one or more of the networks via twisted pair wires, coaxial cable, fiber optics, radio waves, infrared, or other communication or transmission media.

The term "network" as used herein and depicted in the drawings refers not only to systems in which remote devices are coupled together via one or more communication paths, but also to stand-alone devices that may be coupled, from time to time, to such systems that have storage capability. Consequently, the term "network" includes not only a "physical network" but also a "content network," which is comprised of the data-attributable to an entity-which resides across all physical networks.

Figure 3:
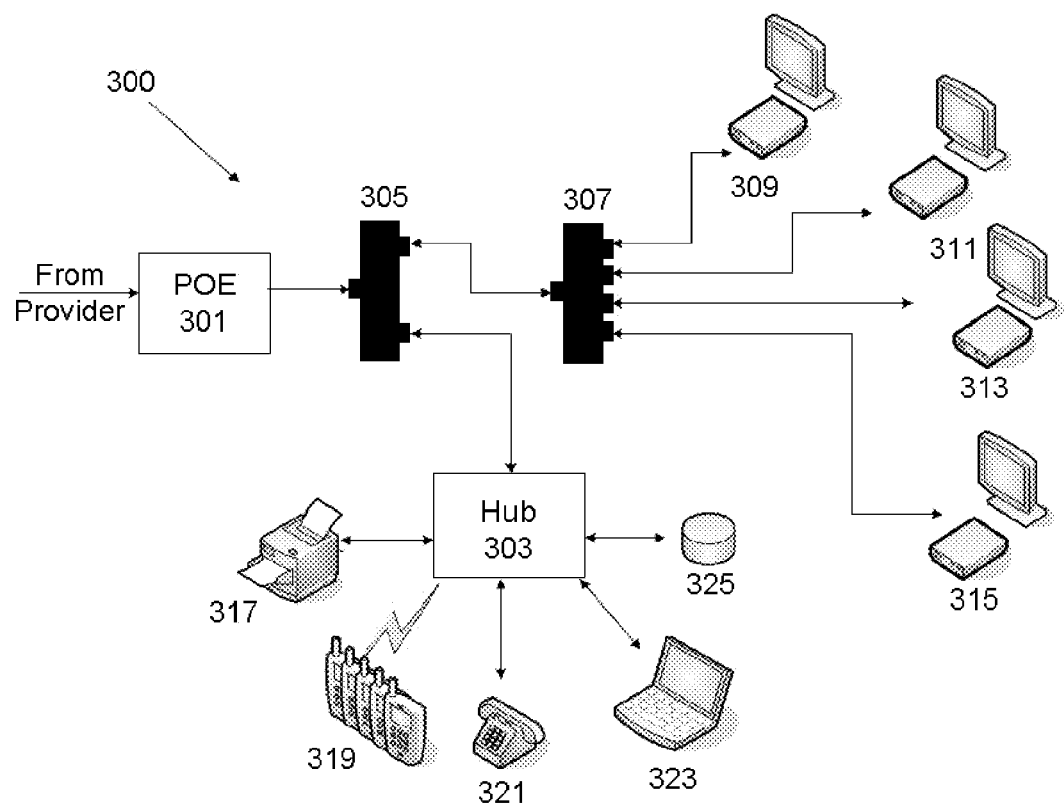
FIG. 3 illustrates a system for providing a centralized communication hub that may be used to implement one or more illustrative aspects described herein.

FIG. 3 illustrates an exemplary system for providing a centralized communication hub at a customer location for routing incoming/outgoing telephone calls to a display in accordance with at least one aspect of the disclosure. System 300 comprises, for example, a point-of-entry (POE) filter 301, communications hub 303, two-way splitter 305, four-way splitter 307, and gateways (e.g., set top boxes with attached displays) 309, 311, 313, and 315. Within system 300, television signals may arrive from a provider at POE filter 301. POE filter 301 may prevent television signals meant for a particular customer location from being transmitted to other customer locations. The signals may then split into two pathways at two-way splitter 305.

The first pathway may allow the television signals to be forwarded through a four way splitter 307 and on to four devices 309, 311, 313, and 315, which devices may have set top box type functionality. In certain embodiments, devices 309, 311, 313, and 315 may be located in separate rooms within a home. Although separate devices are shown for the display screen and the gateway of devices 309, 311, 313, and 315, they may be integrated into one. In general, it should be noted that splitter 307 may feed any number of devices with set top box type functionality. Once the television signals reach devices 309, 311, 313, and 315, a television screen associated with these devices may display content represented by the signals. Devices 309, 311, 313, and 315 may also be wireless handheld devices having or attached to a display.

Alternatively, signals may be transmitted to hub 303 from splitter 305. Hub 303 may include an eMTA, or a similarly functioning device, and embedded cable modem (eCM). The eMTA within hub 303 may also include specialized software to allow hub 303 to communicate with peripheral devices such as fax machine 317, digital enhanced cordless telecommunications (DECT) phone 319, telephone 321, laptop 323, and file server 325. As shown by the arrows connecting hub 303 with devices 317-325, communication between the hub 303 and each of the devices 317-325 may occur over different wired/wireless media (e.g., USB, Cat5e, etc).

If hub 303 detects a telephone call on phone devices 319 or 321, the caller ID information may be processed by the eMTA within the hub 303. The eMTA may concurrently or near concurrently transmit a message, for example a MoCA broadcast/multicast or otherwise transmitted message to any or all of the devices 309, 311, 313, and 315, indicating that there is a caller ID message. To allow caller ID information to reach devices 309, 311, 313, and 315 back through splitter 305, the hub 303 may send the information using frequencies outside of the isolation range of the splitter 305. Alternatively, if either phone 319 or 321 is picked up, the message may not be sent at all or may disappear from the display screens of devices 309-315. If one of the conventional phones 319 or 321 is not picked up, a user may be given the option of answering the incoming phone call via the screen displays associated with devices 309-315. In this scenario, a customer may answer the incoming phone call, for example, by pressing a button on the appropriate gateway, its associated display, or via a remote control in communication with the gateway and/or display, to hear the telephone call through the TV speakers or other audio device.

In addition to answering the phone call, a customer may use a microphone, video camera, or other input/output device connected to one of devices 309-315 to communicate with the caller. Devices 309-315 may also be in communication with a video conferencing device (e.g., webcam, camcorder, etc) to allow for audiovisual (AV) conferences between parties. In addition, a customer may use a keypad on the appropriate gateway, its associated display or remote control, to key in a reply message (e.g., SMS/MMS) to an incoming call/text message.

Figure 4A:
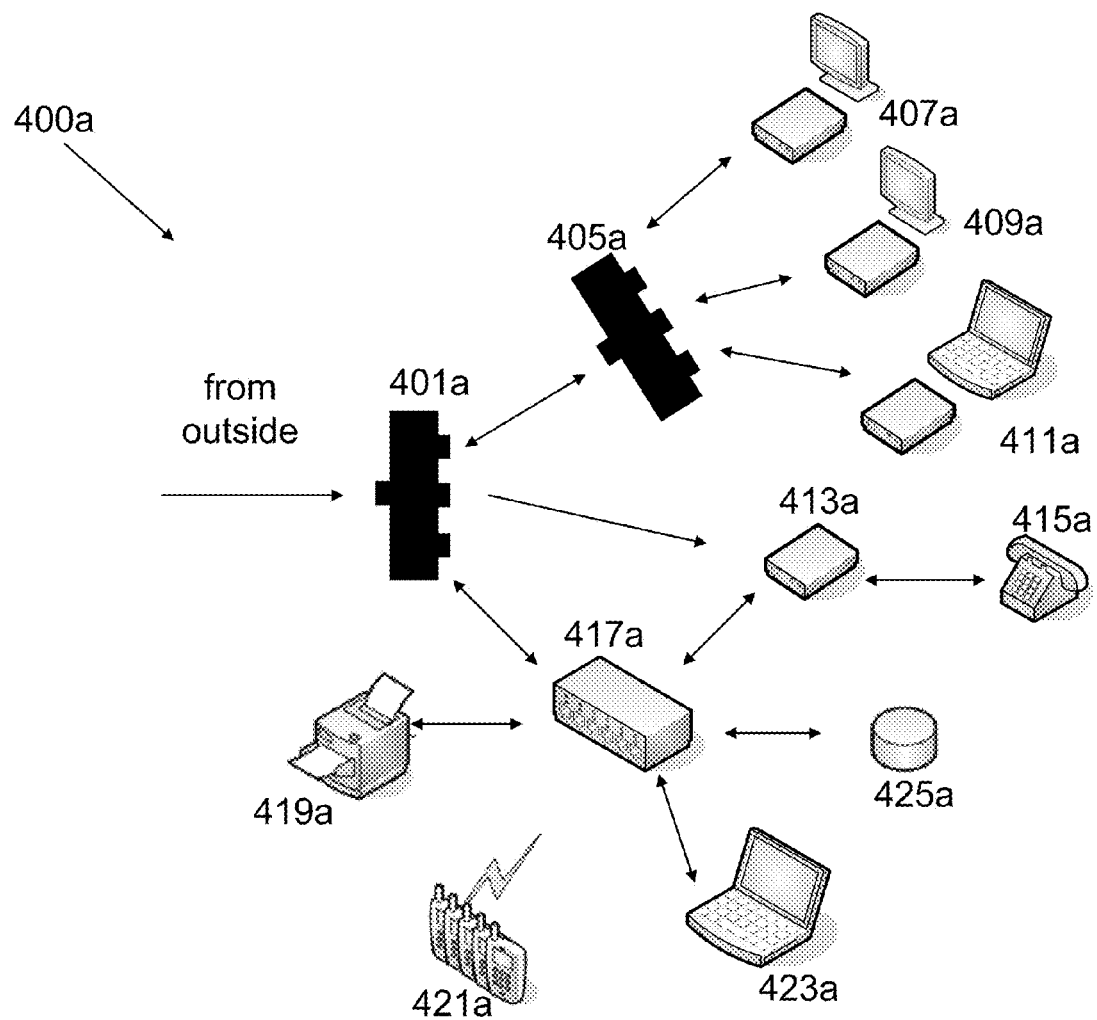
FIG. 4a illustrates system architecture that may be used to implement one or more illustrative aspects described herein.

FIG. 4a illustrates an exemplary system architecture where separate devices perform MTA and wireless communication functions in accordance with at least one aspect of the disclosure. This architecture may be implemented to allow service providers to continue to use legacy MTAs without having to embed wireless communication functions (e.g., via MoCA) into them, thereby reducing overall cost of the hardware. In addition, these MTAs may have less software built-in, as some of the processing capabilities of the eMTA may be shared with the wireless router. System 400a may include a three-way splitter 401a for receiving an initial feed from a distribution network, e.g., a multimedia network. Splitter 401a may be connected to one or more additional splitters 405a, as needed. One output from splitter 401a may connect, in a HFC-type system, for example, to a DOCSIS MTA device 413a, which provides telephone service to one or more telephones 415a.

A second output from splitter 401a may be connected to a router 417a. Router 417a may provide telephone, MoCA, and WiFi routing capabilities. Router 417a may be in communication with one or more fax machines 419a, DECT phones 421a, laptops 423a, and file servers 425a. As shown by the arrows connecting router 417a with devices 419a-425a, communication between the router 417a and each of the devices 419a-425a may occur over different wired/wireless media (e.g., USB, Cat5e, etc). Router 417a and MTA device 413a may further be connected via RJ11 and/or Cat5E cables (twisted pair) to communicate telephone and IP data between each other.

A third output from splitter 401a may be connected to one or more gateways 407a, 409a, and 411a, e.g., using one or more splitters 405a as necessary, to provide cable television and multimedia distribution services to each gateway. Each gateway 407a, 409a, and 411a may include a separate set top box and display, or may include an integrated "cable ready" television.

Each gateway may be connected to an audiovisual device, e.g., a video camera, webcam, or other device having a camera and/or a microphone. The computer connected to decoder 411a may also include gateway services so that a user can watch TV on his or her computer.

Incoming phone calls may be detected by MTA 413a, which may forward the signals to router 417a. Once router 417a receives caller ID information from MTA 413a, router 417a may then forward the information to gateways 407a, 409a, and 411a via splitter 401a and splitter 405a. To allow caller ID information to reach devices 407a, 409a, and 411a back through splitter 401a, the router may send the information via MoCA or otherwise using frequencies outside of the isolation range of the splitter 401a. It should also be noted that, in general, splitter 405a may service any number of gateways, perhaps located in various rooms of a home.

Figure 4B:
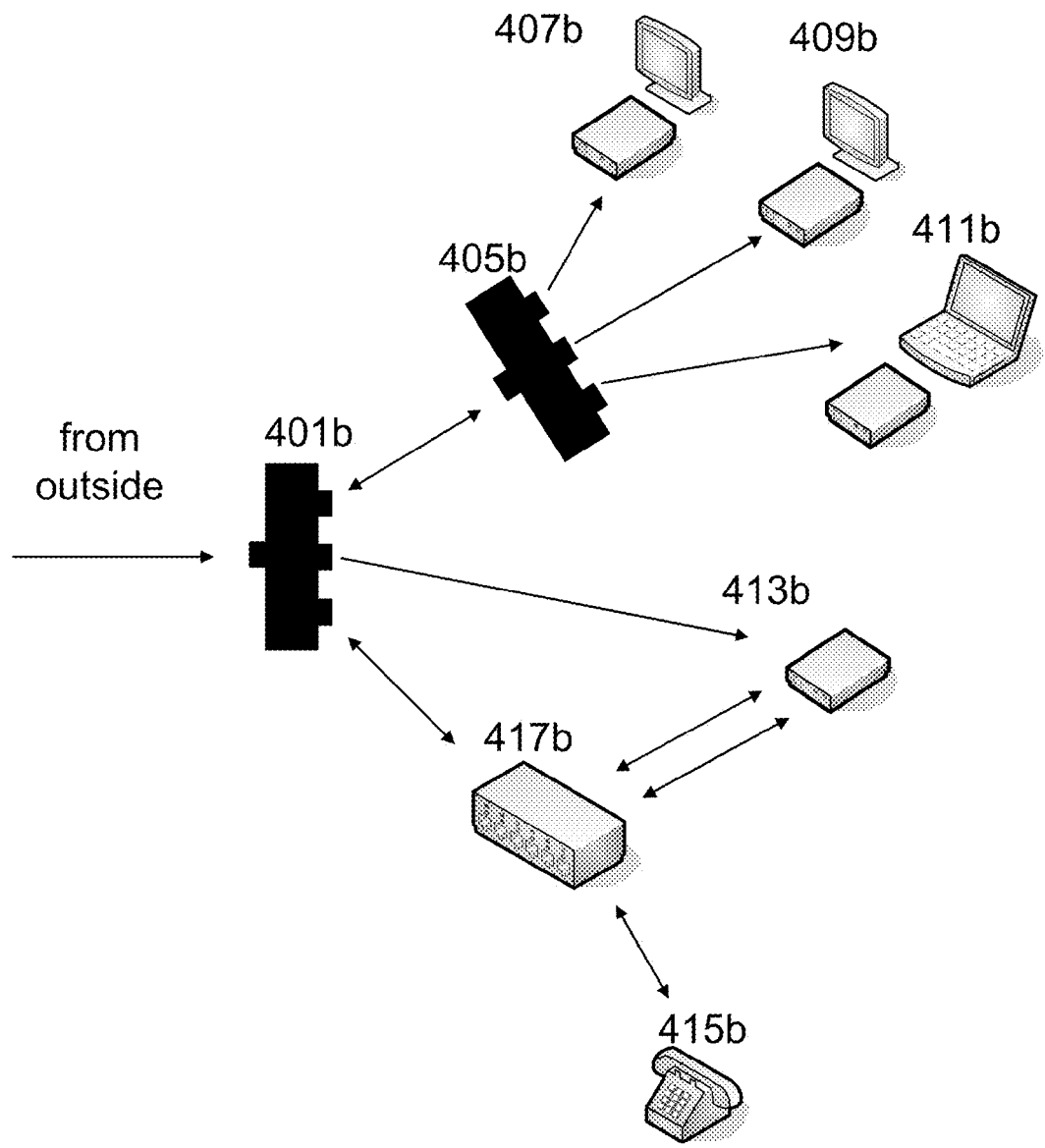
FIG. 4b illustrates system architecture that may be used to implement one or more illustrative aspects described herein.

FIG. 4b illustrates another exemplary system architecture where separate devices perform MTA and wireless communication functions in accordance with at least one aspect of the disclosure. Splitter 401b may split signals between a MoCA router 417b, an MTA 413b, and a splitter 405b. A telephone 415b may be in direct communication with the MoCA router 417b. Television signals may be delivered directly to gateways 407b-411b via splitters 401b and 405b. Meanwhile, when an incoming phone call is detected by phone 415b or by router 417b, the signal is routed through router 417b to MTA 413b where the signals are converted into an appropriate signaling protocol (e.g., G.711 standard, H.264 standard, SMS/MMS, etc). The converted signals are then transmitted to the MoCA router 417b where they are embedded into IP packets and sent through splitters 401b and 405b to devices 407b-411b. When a user decides to receive the incoming call, e.g., by providing user input via a remote control device in response to viewing the incoming call information on the display screen associated with gateways 407b-411b, a signal is transmitted back to the MTA 413b via splitter 405b and splitter 401b to answer the phone line. In this fashion, legacy MTAs 413b with no embedded MoCA routing capabilities may be implemented, thereby reducing the overall cost. In addition, as shown in FIG. 4a, some of the software necessary for implementing an embedded MTA may be implemented in the MoCA router 417b.

Figure 5:
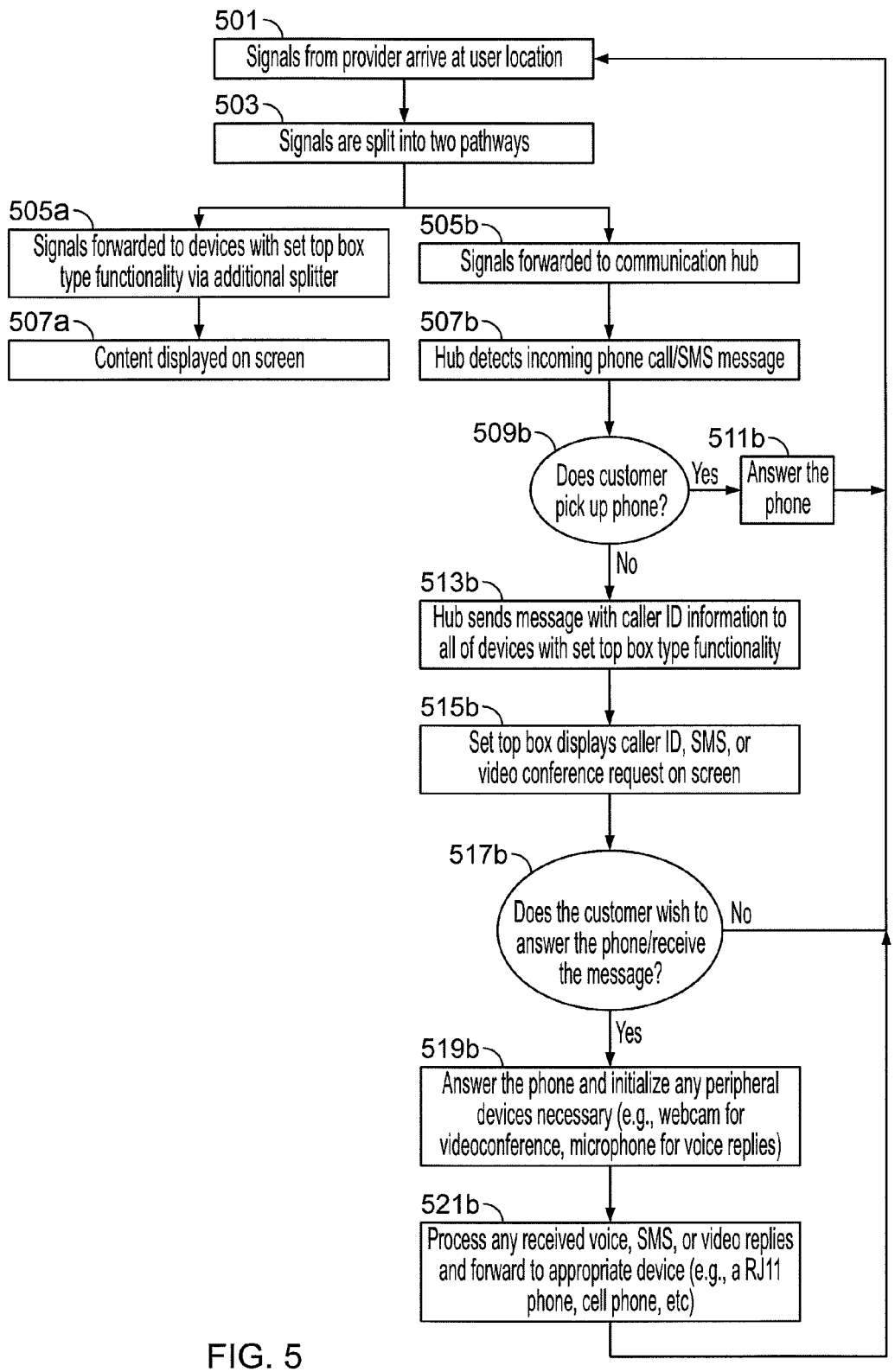
FIG. 5 illustrates a method that may be used to implement one or more illustrative aspects described herein.

FIG. 5 illustrates an exemplary method for providing a centralized communication hub at a customer location for routing incoming/outgoing telephone calls and SMS/MMS messages to a display. The method starts out at step 501 where signals from a provider may arrive at a user location. These signals may include, for example, in band television signals and out-of-band messaging signals. Upon arrival, the signals may traverse a POE filter that prevents the signals from leaking out to other customer locations. Then the signals may be split into two pathways at step 503.

In the first pathway, the signals may be forwarded to as many gateways as needed via additional routing/splitting functions at step 505a. Once the signals reach their destination, the content (e.g., television programs, video on demand, etc.) represented by the signals may be displayed on a television screen, which in one aspect may be associated with a set top box, in step 507a.

In the second pathway, the signals may be forwarded to a communication hub, such as communication hub 303, in step 505b. The hub may be responsible for routing the signals to the appropriate peripheral device. In the case of an incoming phone call, SMS/MMS message, or video conference request, the communication hub may detect an incoming call or message in step 507b. The process then may move to decision step 509b where the hub may decide if the customer has picked up a phone run through an RJ11 or DECT interface. If the user does pick up the phone, the hub may recognize that the phone has been answered in step 511b and the process may subsequently return to the beginning.

If the user does not answer the phone, perhaps within a certain time threshold, the communication hub may send a message, for example a broadcast/multicast message over IP (e.g., using the MoCA protocol) with caller ID information to all of the set top boxes at the customer location in step 513b. Before transmitting this message, the communication hub may convert the message transmitted to an appropriate protocol. If the hub needs to process just audio signals, the communication hub may convert the packets to the G.711 standard, for example. Alternatively, if the hub needs to process both audio and video (e.g., for video conferencing), the communication hub may convert the packets to the H.264 (for video) and/or G.711 standards (for audio), for example. In addition, the Simple Object Access Protocol (SOAP) as a type of XML protocol may be used to wrap a caller ID message. This converted message may include information such as the phone number, name, and location of the caller, among other things. All or a portion of the gateways may then display information related to the caller ID, SMS/MMS message, or video conference request on a display associated with a particular gateway in step 515b.

The process then moves to decision step 517b where the hub may receive an indication of whether or not the customer wishes to answer the phone or receive a message. As stated earlier, the user may transmit this indication via a variety of techniques, including depressing a button on a remote control associated with a gateway and/or issuing an audible command on a voice-activated system, among other things. If the user does not wish to receive the call or message, the process may move back to the beginning.

If the user indicates that she wishes to receive the call or message, the process may move to step 519b, where the communication hub may answer the phone and initialize any peripheral devices that may be necessary for reception. For instance, if an incoming telephone call is received, a microphone and/or speaker attached to a gateway may be turned on so that the customer can hear the caller and reply to him. Alternatively, if an incoming video conference is received, a webcam attached to the appropriate gateway may be initialized.

Then the process may move to step 521b where any received voice, SMS/MMS, or video reply by the user to an incoming call/message is processed and forwarded to the appropriate device. The replies may be forwarded through internet protocol (IP) packets to the communication hub, which may then convert the packets to an appropriate form based on the destination device (e.g., sound for a RJ11 phone, SMS/MMS message for cell phone, etc). Once the call/message is concluded, the process may return to the beginning.

Figure 6:
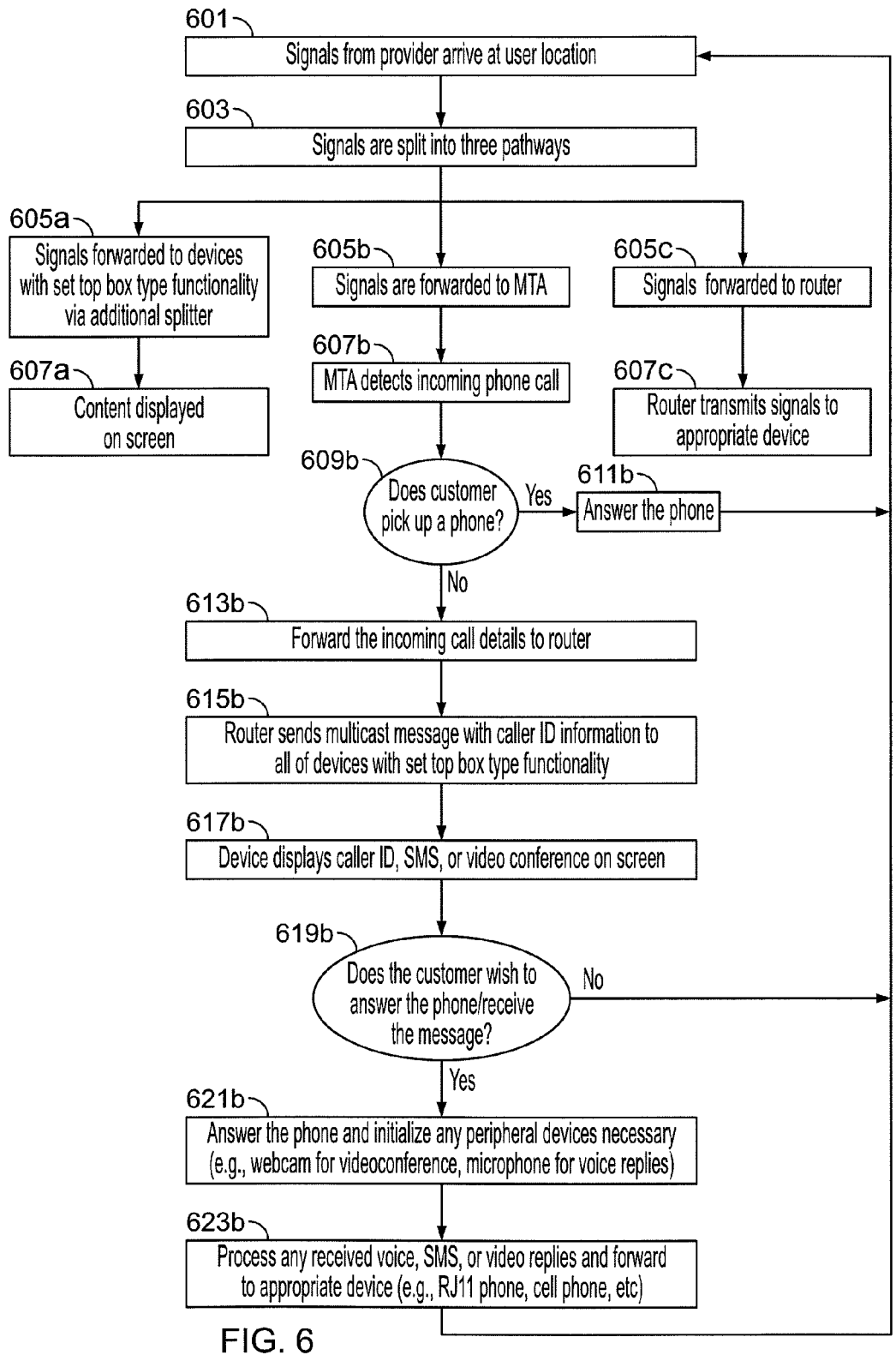
FIG. 6 illustrates a method that may be used to implement one or more illustrative aspects described herein.

FIG. 6 illustrates a method for providing separate devices for performing MTA and wireless communication functions at a customer location and for routing incoming/outgoing telephone/video conferencing calls and SMS/MMS messages to a display in accordance with at least one aspect of the disclosure. The process starts with step 601 where signals from a provider arrive at a customer location (e.g., a home). As before, the signals may then traverse a POE filter. Next, the signals may be split into three pathways in step 603.

In the first pathway, in step 605*a*, the signals may be forwarded to gateways in various rooms of a customer location and the content carried by the signals may be displayed on a television screen associated with the appropriate gateway in step 607*a*.

In the second pathway, in step 605*b*, the signals are forwarded to an MTA. The MTA may be responsible for detecting incoming phone calls over an RJ11 phone line in step 607*b*. The process then may move to decision step 609*b* where the MTA may decide if the customer has picked up an RJ11 phone. If he has, the phone line may be answered and the process may return to the beginning in step 611*b*. If he has not, the caller ID details of the incoming call may be forwarded to a router in step 613*b*.

Next, in step 615*b*, the router sends a message, for example a broadcast/multicast message over IP with the caller ID information to all of the set top boxes at the customer location. Once the gateways receive this information, they may cause the caller ID information, SMS/MMS message, and/or video conference request message to be displayed on the appropriate display in step 617*b*. The process then may move decision step 619*b* where the router may receive confirmation from the customer as to whether or not she wishes to answer the phone and/or receive the message. If she does not, then the process may move back to the beginning step 601. If she does, the phone line may be answered and any peripheral devices necessary for the call are initialized in step 621*b*. Finally, the MTA and router work together to process and forward any received voice, SMS/MMS, or video replies to the incoming call/message in step 623*b*.

In the third pathway, the signals from the headend are forwarded to the router mentioned earlier in step 605*c*. The router may be responsible for transmitting the television signals to the appropriate gateway and/or TV screen in step 607*c*.

Although aspects of the disclosure have been described using exemplary devices that may be found in HFC systems, e.g. cable modems, disclosed aspects are also applicable to other systems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a processor; and
a memory storing computer readable instructions that, when executed by said processor, cause the apparatus to perform:
receiving a caller ID message related to an incoming call;
converting the caller ID message into a first predetermined format for transmission via internet protocol (IP); and
transmitting, through a splitter using frequencies outside of an isolation range of the splitter, the converted caller ID message to a gateway configured to cause display of the caller ID message on a display.

2. The apparatus of claim 1, wherein the apparatus further performs: when a user device selects to answer the incoming call, receiving from the gateway a signal to answer the incoming call.

3. The apparatus of claim 2, wherein the user device comprises a remote control.

4. The apparatus of claim 2, wherein the apparatus further performs: receiving audio signals corresponding to the incoming call.

5. The apparatus of claim 4, wherein the apparatus further performs: converting the audio signals corresponding to the incoming call into a second predetermined format.

6. The apparatus of claim 5, wherein the apparatus further performs: transmitting the converted audio signals to a speaker associated with the display.

7. The apparatus of claim 5, wherein the second predetermined format comprises G.711 standard.

8. The apparatus of claim 4, wherein the apparatus further performs: receiving video signals corresponding to the incoming call.

9. The apparatus of claim 8, wherein the apparatus further performs: converting the video signals corresponding to the incoming call into a third predetermined format.

10. The apparatus of claim 9, wherein the third predetermined format comprises H.264 standard.

11. The apparatus of claim 10, wherein the third predetermined format is further encapsulated using Simple Object Access Protocol (SOAP).

12. The apparatus of claim 9, wherein the apparatus further performs: transmitting the converted video signals to the display for display on the display.

13. The apparatus of claim 12, wherein the converted video signals establish a video conference with the caller using a webcam in communication with the gateway.

14. The apparatus of claim 13, wherein the webcam is configured to display a picture within a picture on the display.

15. The apparatus of claim 14, wherein in the webcam has a built-in microphone for establishing a two way audio connection with the caller.

16. An apparatus comprising:
a processor; and
a memory storing computer readable instructions that, when executed by said processor, cause the apparatus to perform:
receiving, through a splitter using frequencies outside of an isolation range of the splitter, a converted caller ID message related to an incoming call in a predetermined format via internet protocol;
displaying the converted caller ID message on a display;
receiving a signal from a user device indicative of a decision to answer the incoming call; and
transmitting to a gateway a signal to answer the incoming call.

17. The apparatus of claim 16, wherein the gateway comprises a media terminal adapter.

* * * * *